(12) United States Patent
Shinohara

(10) Patent No.: US 9,368,812 B2
(45) Date of Patent: Jun. 14, 2016

(54) FUEL CELL STACK

(75) Inventor: Masashi Shinohara, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 599 days.

(21) Appl. No.: 13/823,798

(22) PCT Filed: Oct. 26, 2011

(86) PCT No.: PCT/JP2011/075231
§ 371 (c)(1),
(2), (4) Date: Mar. 15, 2013

(87) PCT Pub. No.: WO2012/081322
PCT Pub. Date: Jun. 21, 2012

(65) Prior Publication Data
US 2013/0183598 A1 Jul. 18, 2013

(30) Foreign Application Priority Data
Dec. 15, 2010 (JP) .................. 2010-278726

(51) Int. Cl.
*H01M 8/04* (2006.01)
*H01M 8/00* (2016.01)
*H01M 8/02* (2016.01)
*H01M 8/12* (2016.01)
*H01M 8/24* (2016.01)

(52) U.S. Cl.
CPC .......... *H01M 8/04089* (2013.01); *H01M 8/006* (2013.01); *H01M 8/0247* (2013.01); *H01M 8/04014* (2013.01); *H01M 8/1206* (2013.01); *H01M 8/2485* (2013.01); *H01M 8/247* (2013.01); *Y02E 60/521* (2013.01); *Y02E 60/525* (2013.01)

(58) Field of Classification Search
None
See application file for complete search history.

(56) References Cited

U.S. PATENT DOCUMENTS

| | | | | |
|---|---|---|---|---|
| 2002/0182458 A1* | 12/2002 | Ingraham | ............. | B01J 19/2485 429/412 |
| 2005/0136316 A1* | 6/2005 | Tsunoda | ............. | H01M 8/0247 429/457 |
| 2007/0111068 A1* | 5/2007 | Gudlavalleti | ....... | H01M 8/0282 429/458 |
| 2008/0096086 A1* | 4/2008 | Ogawa | ................ | H01M 8/0258 429/446 |
| 2010/0015481 A1* | 1/2010 | Kanao | ................... | H01M 8/002 429/456 |

(Continued)

FOREIGN PATENT DOCUMENTS

| | | |
|---|---|---|
| JP | 07-022059 | 1/1995 |
| JP | 07-176316 | 7/1995 |
| JP | 2004-055195 | 2/2004 |

(Continued)

*Primary Examiner* — Ula C Ruddock
*Assistant Examiner* — Matthew Van Oudenaren
(74) *Attorney, Agent, or Firm* — Rankin, Hill & Clark LLP

(57) ABSTRACT

A fuel cell stack includes a fuel cell. A separator of the fuel cell includes a sandwiching section for sandwiching an electrolyte electrode assembly, a bridge section, and a reactant gas supply section. A fuel gas channel and an oxygen-containing gas channel are formed in the sandwiching section. A fuel gas supply channel, a fuel gas return channel, and an oxygen-containing gas supply channel are formed in the bridge section. A fuel gas supply passage, a fuel gas discharge passage and an oxygen-containing gas supply passage are formed in the reactant gas supply section. The bridge section is provided integrally with the reactant gas supply section, and surrounds the entire outer circumference of the sandwiching section.

19 Claims, 17 Drawing Sheets

(56) References Cited

U.S. PATENT DOCUMENTS

2010/0092837 A1 4/2010 Akbay et al.
2010/0209820 A1 8/2010 Akbay et al.

FOREIGN PATENT DOCUMENTS

JP          2008-251236          10/2008
WO       WO2008023751       *   2/2008

* cited by examiner

⇨ OXYGEN-CONTAINING GAS
⇨ FUEL GAS

FUEL CELL STACK

TECHNICAL FIELD

The present invention relates to a fuel cell stack formed by stacking a plurality of fuel cells. Each of the fuel cells is formed by stacking an electrolyte electrode assembly and a separator. The electrolyte electrode assembly includes an anode, a cathode, and an electrolyte interposed between the anode and the cathode.

BACKGROUND ART

Typically, solid oxide fuel cells (SOFC) employ an electrolyte of ion-conductive solid oxide such as stabilized zirconia. The electrolyte is interposed between an anode and a cathode to form an electrolyte electrode assembly (MEA). The electrolyte electrode assembly is sandwiched between a pair of separators (bipolar plates). In use, generally, predetermined numbers of the separators and the electrolyte electrode assemblies are stacked together to form a fuel cell stack.

In the fuel cell, in order to supply a fuel gas such as a hydrogen-containing gas and an oxygen-containing gas such as the air to the anode and the cathode of the electrolyte electrode assembly, respectively, a fuel gas channel and an oxygen-containing gas channel are formed along surfaces of the separator.

For example, as shown in FIG. 17, a flat plate stack type fuel cell disclosed in Japanese Laid-Open Patent Publication No. 2008-251236 includes a separator 1 stacked on a power generation cell. The separator 1 includes an interconnection part 2 provided at a central portion thereof where power generation cells and current collectors are stacked together, and a pair of arms 3a, 3b supporting the interconnection part 2 at opposite marginal portions. Each of the arms 3a, 3b has a narrow stripe shape with small clearance interposed between each arm 3a, 3b and the interconnection part 2, so that the arms 3a, 3b have flexibility for allowing displacement in the stacking direction.

The interconnection part 2 has a function to supply oxygen-containing gas and fuel gas to the power generation cells, and an oxygen-containing gas channel 4 as a passage of the oxygen-containing gas (air) and a fuel gas channel 5 as a passage of the fuel gas are formed in the interconnection part 2.

An oxygen-containing gas hole 6 and a fuel gas hole 7 extend through ends of the arms 3a, 3b in the thickness direction, respectively. The oxygen-containing gas hole 6 is connected to the oxygen-containing gas channel 4 through one arm 3a, and the fuel gas hole 7 is connected to the fuel gas channel 5 through the other arm 3b.

The oxygen-containing gas and the fuel gas flow from the oxygen-containing gas hole 6 and the fuel gas hole 7 through the oxygen-containing gas channel 4 and the fuel gas channel 5. Then, the oxygen-containing gas and the fuel gas are ejected from gas ejection ports 4a, 5a at ends of the gas channels provided at the center of the interconnection part 2 toward the center of the electrode surfaces of the power generation cells.

SUMMARY OF INVENTION

In the fuel cells, each of the arms 3a, 3b is provided over an angular range of about 90° along the outer circumference of the interconnection part 2 serving as a sandwiching section. In the structure, desired loads cannot be applied to the interconnection part 2 and a manifold part (i.e., the oxygen-containing gas hole 6 and the fuel gas hole 7), independently.

Further, the oxygen-containing gas hole 6 and the fuel gas hole 7 are formed at diagonal positions, i.e., spaced from each other in a radial direction. Therefore, when the arms 3a, 3b are expanded by heat, since positions of the oxygen-containing gas hole 6 and the fuel gas hole 7 are fixed, the expansion tends to adversely affect the interconnection part 2, and as a result, distortion or the like may occur in the separator 1 undesirably.

The present invention has been made to solve the problems of this type, and an object of the present invention is to provide a fuel cell stack having simple structure in which distortion in separators resulting from heat is suppressed as much as possible, and improvement in the power generation performance, heat efficiency, and durability is achieved.

The present invention relates to a fuel cell stack formed by stacking a plurality of fuel cells in a stacking direction. Each of the fuel cells is formed by stacking an electrolyte electrode assembly and a separator. The electrolyte electrode assembly includes an anode, a cathode, and an electrolyte interposed between the anode and the cathode.

The separator of the fuel cell stack includes a sandwiching section for sandwiching the electrolyte electrode assembly, a bridge section connected to the sandwiching section, and a reactant gas supply section connected to the bridge. A fuel gas channel for supplying a fuel gas along an electrode surface of the anode and an oxygen-containing gas channel for supplying an oxygen-containing gas along an electrode surface of the cathode are provided separately in the sandwiching section. A fuel gas supply channel for supplying the fuel gas to the fuel gas channel, a fuel gas return channel for returning the fuel gas which has flowed through the fuel gas channel, and an oxygen-containing gas supply channel for supplying the oxygen-containing gas to the oxygen-containing gas channel are formed in the bridge section. A fuel gas supply passage for supplying the fuel gas to the fuel gas supply channel, a fuel gas discharge passage for discharging the fuel gas which has flowed through the fuel gas return channel, and an oxygen-containing gas supply passage for supplying the oxygen-containing gas to the oxygen-containing gas supply channel each extend through the reactant gas supply section in the stacking direction. The bridge section is provided integrally with the reactant gas supply section, and surrounds the entire outer circumference of the sandwiching section.

In the present invention, all of the fuel gas supply passage, the fuel gas discharge passage, and the oxygen-containing gas supply passage as components of the manifold are formed concentratedly in the single reactant gas supply section. In the structure, the components of the manifold requiring a high load for gas sealing are not positioned distantly from one another. Thus, it becomes possible to suppress occurrence of distortion in the separators due to heat expansion or heat contraction as much as possible.

Further, failures in contact between the separator and the electrolyte electrode assembly due to distortion is suppressed, and improvement in the power generation performance is achieved. Moreover, since damages of the electrolyte electrode assembly due to distortion are suppressed, durability of the electrolyte electrode assembly is improved suitably.

Further, the fuel gas supply passage, the fuel gas discharge passage, and the oxygen-containing gas supply passage are provided in the reactant gas supply section serving as the reactant gas manifold. The fuel gas supply channel, the fuel gas return channel, and the oxygen-containing gas supply channel are formed in the bridge section. In the structure, the fuel gas and the oxygen-containing gas, which are supply gases, tend to be heated easily by the hot fuel gas. Thus, thermally self-sustaining operation can be facilitated, and improvement in the heat efficiency is achieved advantageously Further, the bridge section is formed integrally with the reactant gas supply section, and surrounds the entire outer circumference of the sandwiching section. In the structure, the fuel gas and the oxygen-containing gas serving as the supply gases are heated suitably by the hot exhaust gas (oxygen-containing gas), which is, after the reaction, discharged to the outer circumferential portion of the sandwiching section. Thus, thermally self-sustaining operation is facilitated, and improvement in the heat efficiency is achieved. The overall length of the bridge section can be made large.

The above and other objects, features, and advantages of the present invention will become more apparent from the following description when taken in conjunction with the accompanying drawings in which preferred embodiments of the present invention are shown by way of illustrative example.

DESCRIPTION OF EMBODIMENTS

Figure 1:
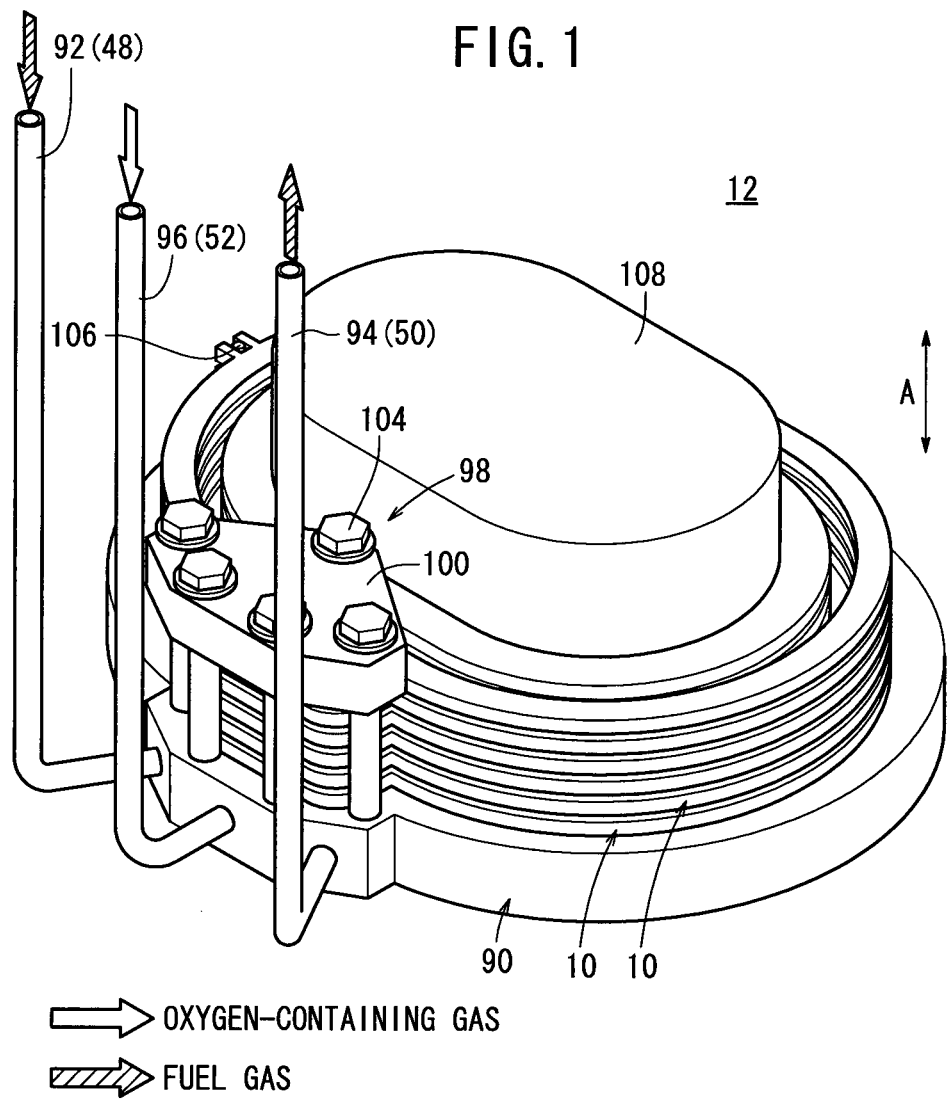
FIG. 1 is a perspective view schematically showing a fuel cell stack according to a first embodiment of the present invention.
Figure 2:
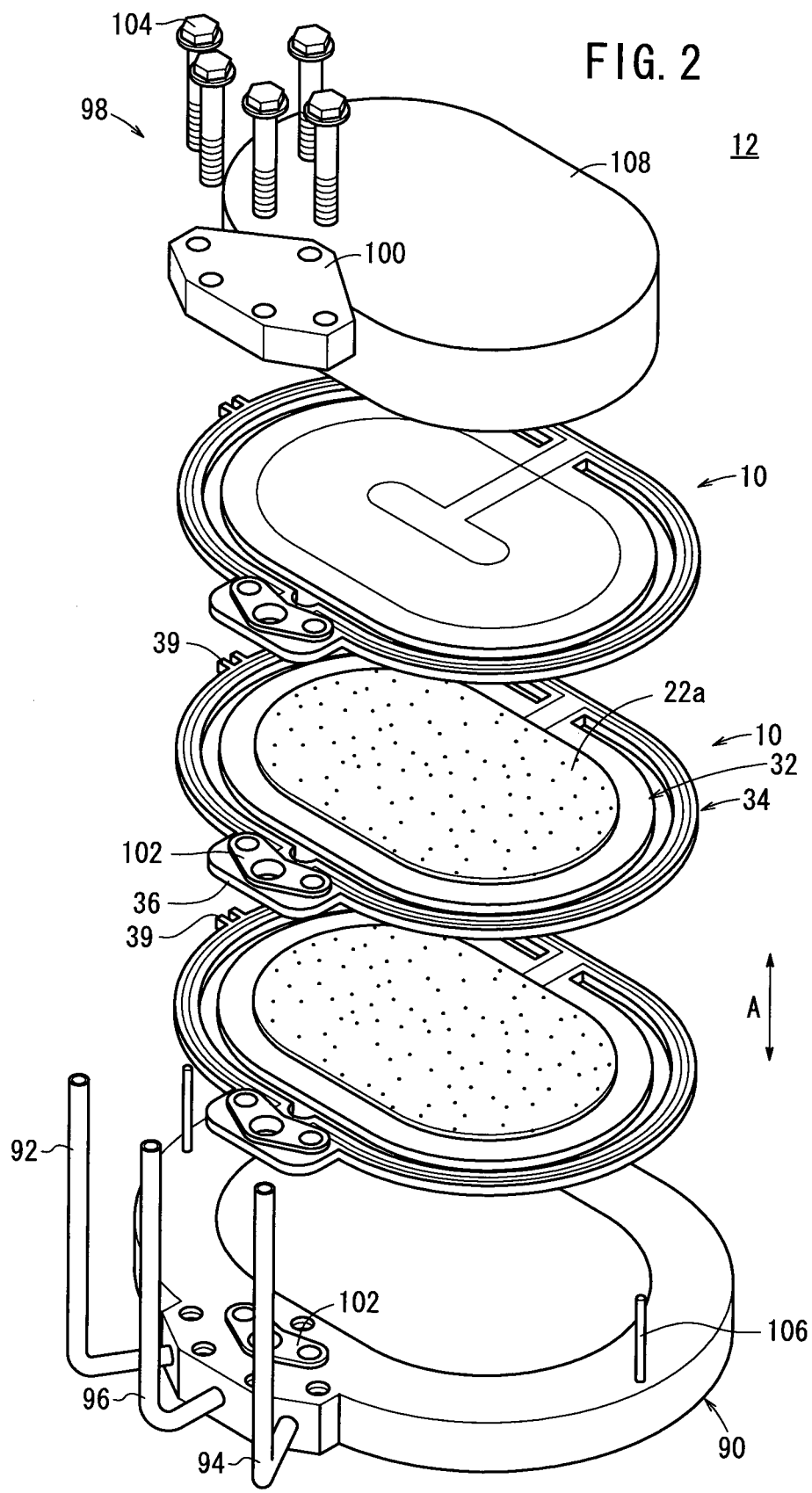
FIG. 2 is a partial exploded perspective view showing the fuel cell stack.

As shown in FIGS. 1 and 2, a fuel cell 10 of a fuel cell stack 12 according to a first embodiment of the present invention is formed by stacking a plurality of solid oxide fuel cells in a vertical direction indicated by an arrow A. As described later, the fuel cell 10 is a flat plate stack type solid oxide fuel cell. The fuel cell stack 12 is used in various applications, including stationary and mobile applications. For example, the fuel cell stack 12 is mounted on a vehicle.

Figure 3:
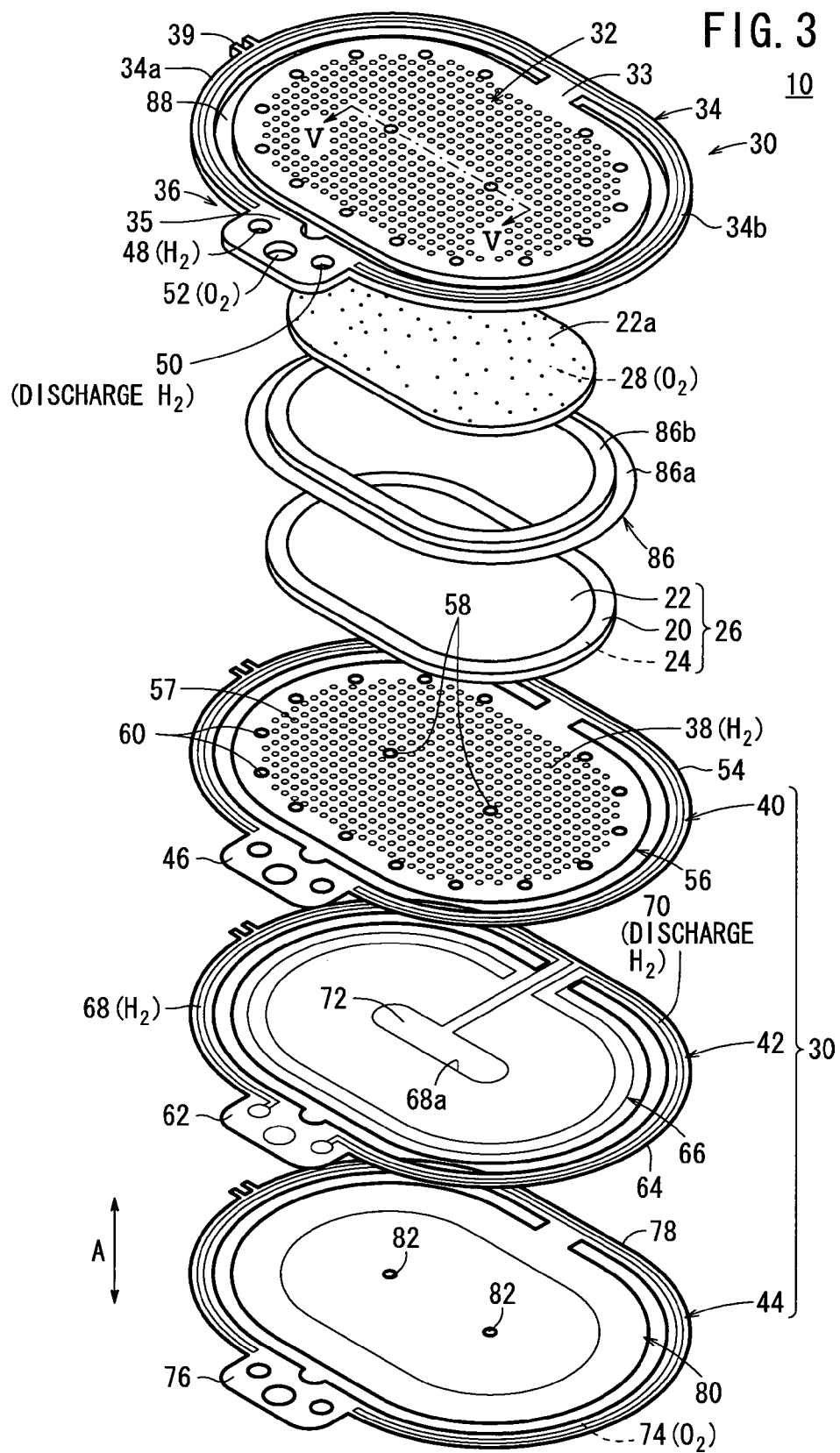
FIG. 3 is an exploded perspective view showing a fuel cell of the fuel cell stack.
Figure 4:
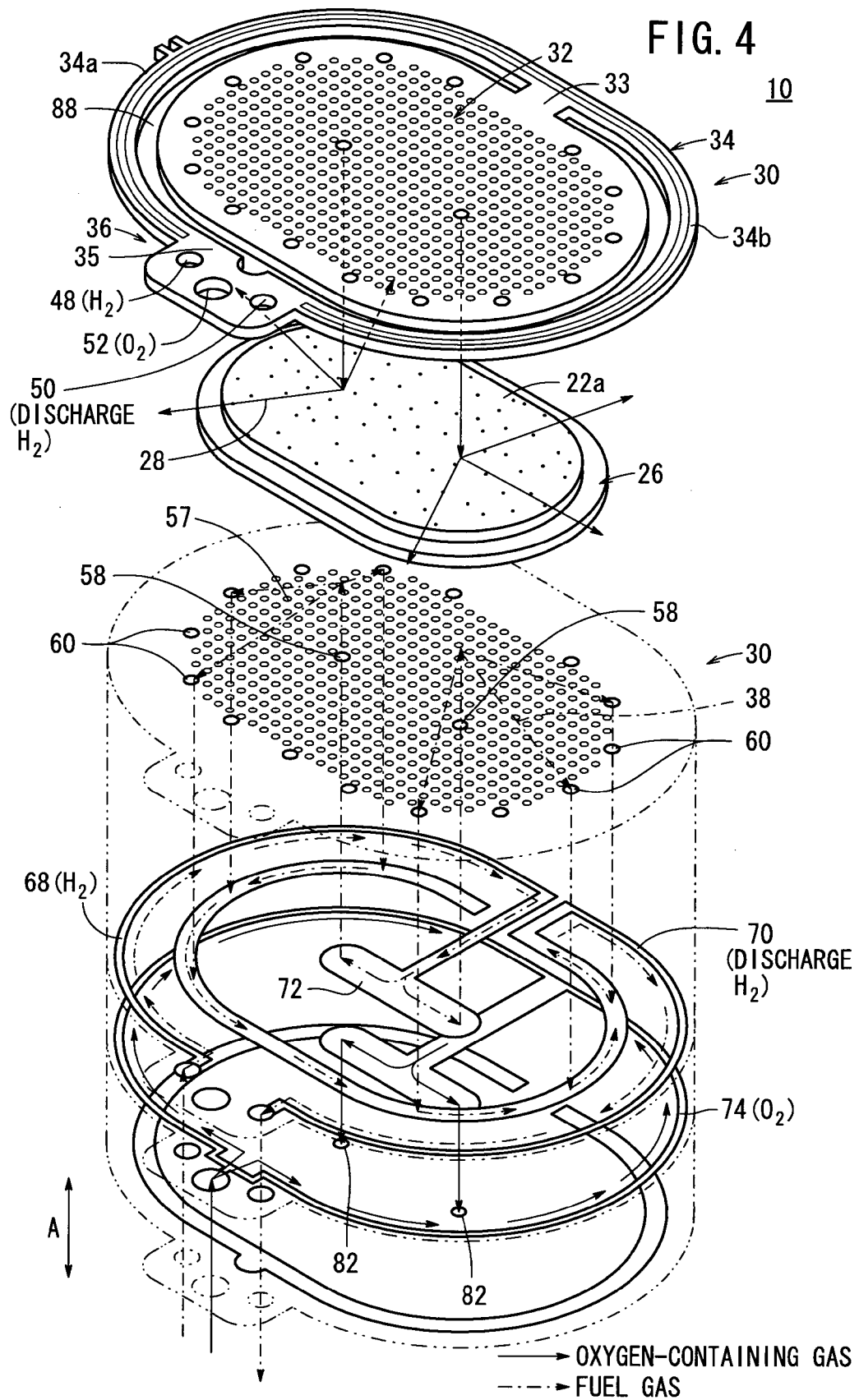
FIG. 4 is a partial exploded perspective view showing gas flows in the fuel cell.
Figure 5:
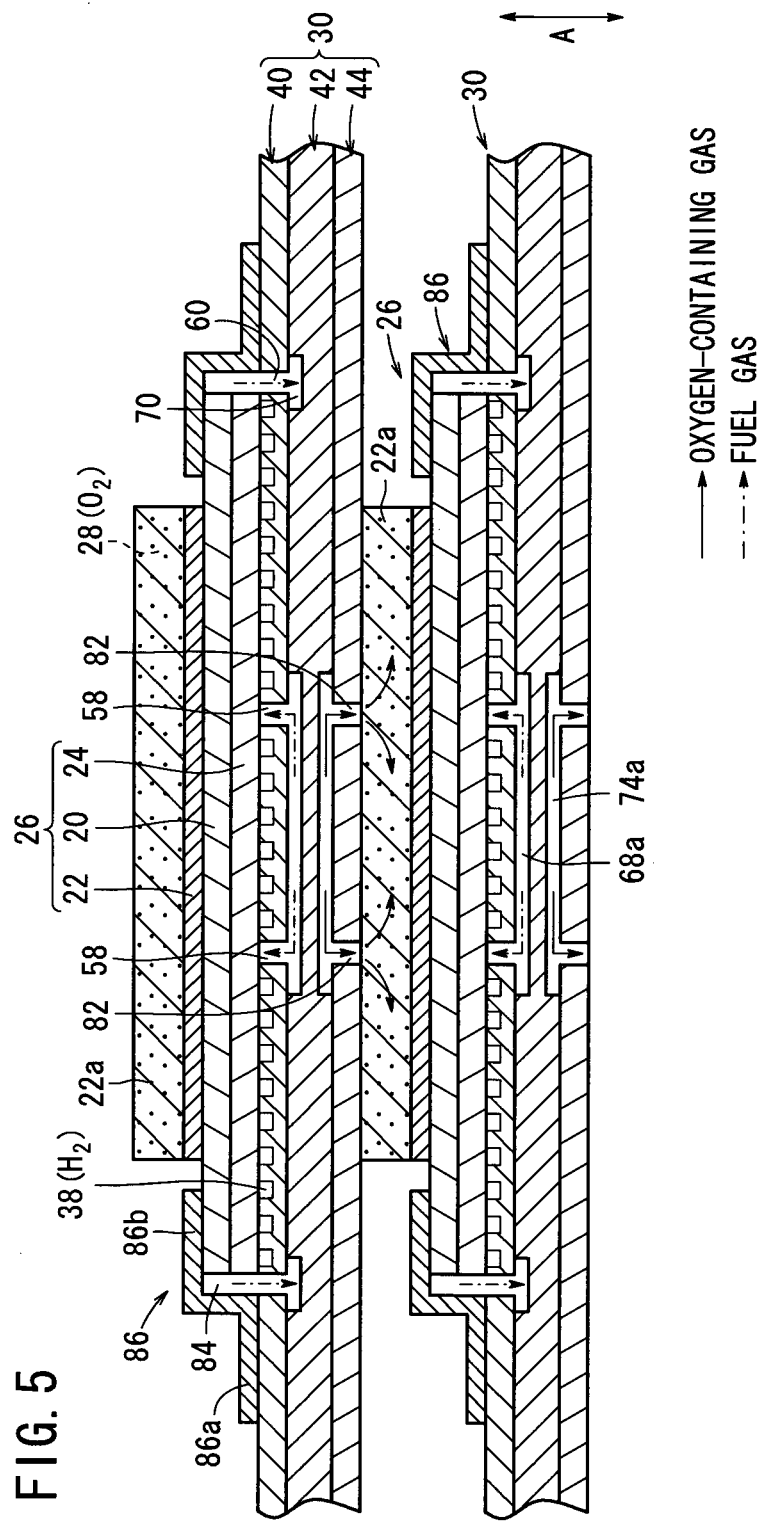
FIG. 5 is a cross sectional view showing the fuel cell, taken along a line V-V in FIG. 3.

As shown in FIGS. 3 to 5, the fuel cell 10 includes an electrolyte electrode assembly (MEA) 26. The electrolyte electrode assembly 26 includes a cathode 22, an anode 24, and an electrolyte (electrolyte plate) 20 interposed between the cathode 22 and the anode 24. For example, the electrolyte 20 is made of ion-conductive solid oxide such as stabilized zirconia. The electrolyte electrode assembly 26 has an oval shape (or an elliptic shape). The surface area of the cathode 22 is smaller than the surface areas of the electrolyte 20 and the anode 24.

A cathode current collector 22a having an oval shape (or an elliptic shape) is provided on the electrolyte electrode assembly 26 so as to contact the cathode 22. For example, the cathode current collector 22a is made of foamed metal, and an oxygen-containing gas channel 28 is formed by internal space of the cathode current collector 22a.

The fuel cell 10 is formed by sandwiching the single electrolyte electrode assembly 26 between a pair of separators 30. In practice, the separators 30 and the electrolyte electrode assemblies 26 are stacked alternately.

The separator 30 includes a sandwiching section 32 for sandwiching the electrolyte electrode assembly 26, a narrow bridge section 34 connected to the sandwiching section 32 through a first connector section 33, and a reactant gas supply section 36 connected to the bridge section 34 through a second connector section 35. The first connector section 33 and the second connector section 35 are arranged opposite to each other across the sandwiching section 32.

The bridge section 34 is provided integrally with the reactant gas supply section 36, and surrounds the entire outer circumference of the sandwiching section 32. As with the sandwiching section 32, the bridge section 34 and the reactant gas supply section 36 have an oval shape (or an elliptic shape) as a whole.

The oxygen-containing gas channel 28 is formed between the sandwiching section 32 and the cathode 22 of the electrolyte electrode assembly 26 by providing the cathode current collector 22a between the sandwiching section 32 and the cathode 22. Further, a fuel gas channel 38 is formed between the anode 24 of the electrolyte electrode assembly 26 and the separator 30. A positioning section 39 protruding in a direction perpendicular to the reactant gas supply section 36 is provided in the bridge section 34.

The separator 30 includes, e.g., three plates, a first plate 40, a second plate 42 and a third plate 44. For example, the first plate 40, the second plate 42, and the third plate 44 are metal plate of, e.g., stainless alloy, and joined together by brazing, diffusion boding, laser welding or the like. The separator 30 may be formed by joining four or more plates.

Figure 6:
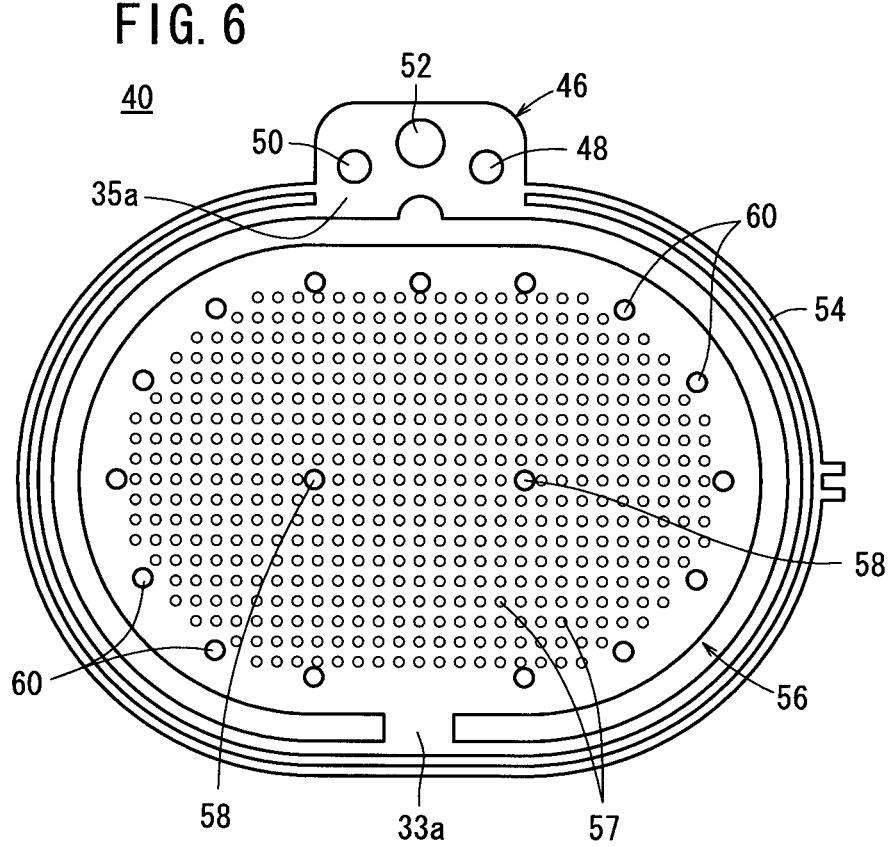
FIG. 6 is a plan view showing a first plate of a separator of the fuel cell.

As shown in FIGS. 3 and 6, the first plate 40 includes a first reactant gas supply member 46 having a rectangular shape or an oval shape as part of the reactant gas supply section 36. A fuel gas supply passage 48 for supplying a fuel gas in the stacking direction indicated by the arrow A, a fuel gas discharge passage 50 for discharging the fuel gas which has flowed through the fuel gas channel 38, and an oxygen-containing gas supply passage 52 for supplying the oxygen-containing gas extend through the first reactant gas supply member 46.

In the reactant gas supply section 36, the oxygen-containing gas supply passage 52 is formed between the fuel gas supply passage 48 and the fuel gas discharge passage 50. The fuel gas supply passage 48, the oxygen-containing gas supply passage 52, and the fuel gas discharge passage 50 are arranged along the outer shape of the sandwiching section 32.

A narrow first bridge member 54 of the bridge section 34 is connected to the first reactant gas supply member 46 through a second connector section 35a, and a first sandwiching member 56 having a relatively large diameter is provided integrally with the first bridge member 54 through a first connector section 33a.

The first sandwiching member 56 is a part of the sandwiching section 32, and has an oval shape. The first sandwiching member 56 has a diameter larger than that of the electrolyte electrode assembly 26. The first sandwiching member 56 has a plurality of protrusions 57 forming the fuel gas channel 38, and at least two fuel gas inlets 58 for supplying the fuel gas are provided in the first sandwiching member 56, e.g., at positions corresponding to the centers of the oval first sandwiching member 56. A plurality of fuel gas return holes 60 for returning the fuel gas that has flowed through the fuel gas channel 38 are formed along a virtual line of an oval shape or elliptic shape around the outer circumference of the electrolyte electrode assembly 26.

Figure 7:
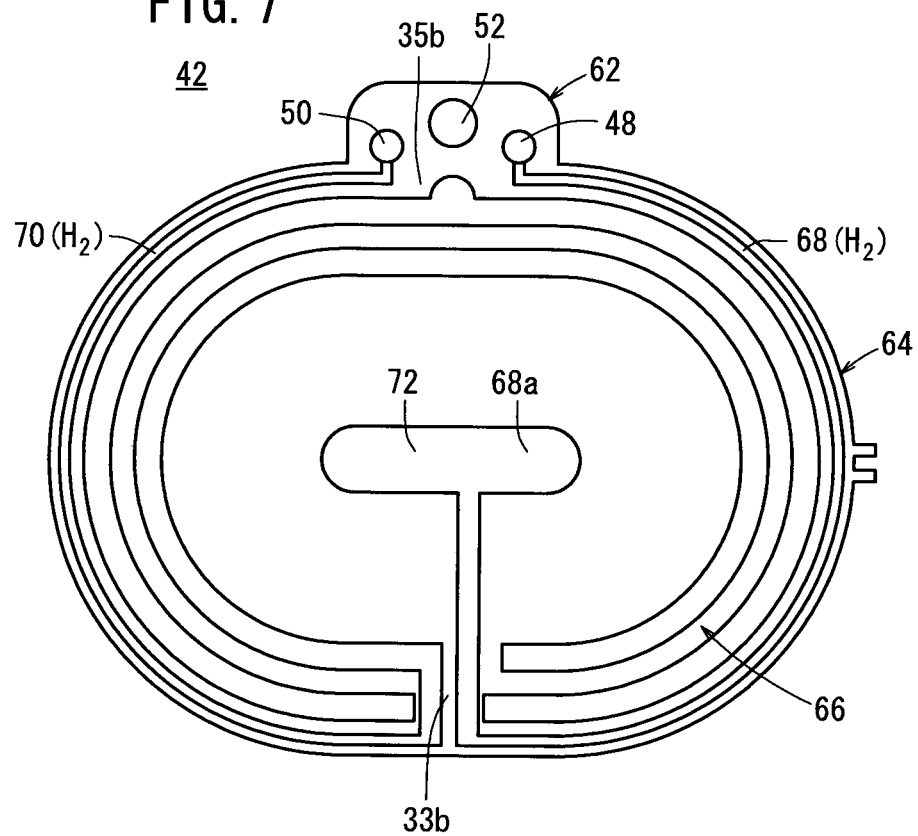
FIG. 7 is a plan view showing a second plate of the separator as viewed from one side.

As shown in FIG. 7, the second plate 42 includes a second reactant gas supply member 62 as part of the reactant gas supply section 36, and the reactant gas supply member 62 has a rectangular shape or an oval shape. The fuel gas supply passage 48, the oxygen-containing gas supply passage 52, and the fuel gas discharge passage 50 extend through the second reactant gas supply member 62. A narrow second bridge member 64 is connected to the second reactant gas supply member 62 through a second connector section 35b, and a second sandwiching member 66 having a relatively large diameter is provided integrally with the second bridge member 64 through a first connector section 33b.

A fuel gas supply channel 68 and a fuel gas return channel 70 are formed respectively in arc-like portions into which the outer circumference of the second bridge member 64 is divided by the first and second connector sections 33b, 35b on the surface of the second bridge member 64 that is joined to the first plate 40. More specifically, the fuel gas supply channel 68 is formed on one side 34a of the bridge section 34, and the fuel gas return channel 70 is formed on the other side 34b of the bridge section 34.

One end of the fuel gas supply channel 68 is connected to the fuel gas supply passage 48, and the other end of the fuel gas supply channel 68 extends through the first connector section 33b into the second sandwiching member 66 to form an oval fuel gas chamber 68a at the center of the second sandwiching member 66. Reforming catalyst (e.g., foamed nickel and catalyst) 72 for reforming the fuel gas as necessary is provided in the fuel gas chamber 68a.

One end of the fuel gas return channel 70 is connected to the fuel gas discharge passage 50, and the other end of the fuel gas return channel 70 extends through the first connector section 33b into the second sandwiching member 66. The other end of the fuel gas return channel 70 extends through positions of the fuel gas return holes 60 of the first sandwiching member 56, and has an oval shape (or an elliptic shape) along the outer circumference of the second sandwiching member 66.

Figure 8:
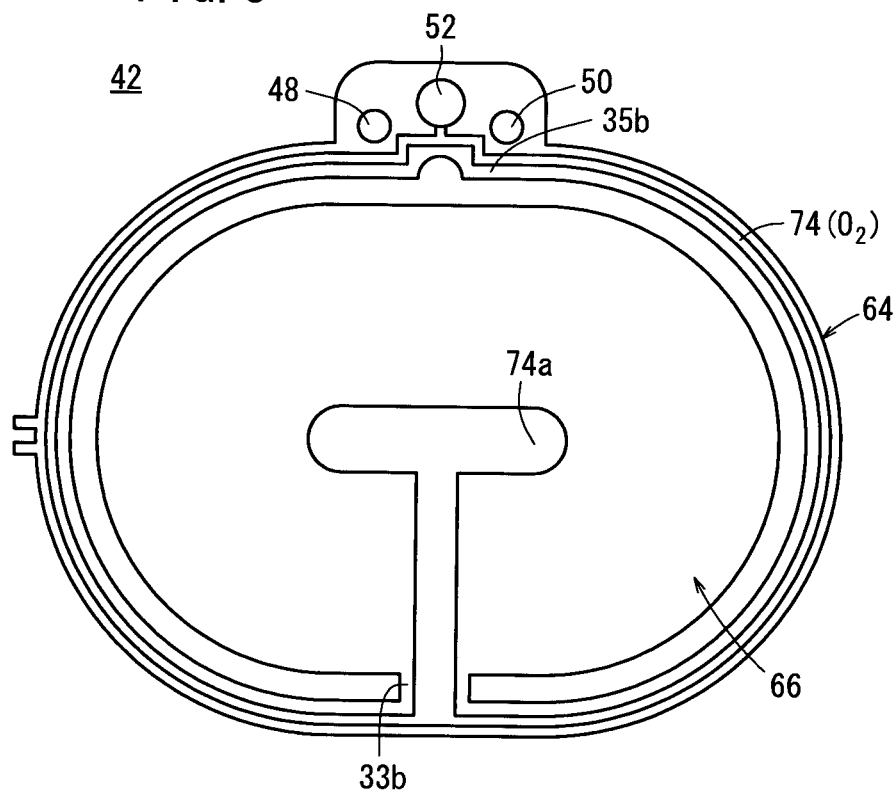
FIG. 8 is a plan view showing the second plate of the separator as viewed from the other side.

As shown in FIG. 8, an oxygen-containing gas supply channel 74 connected to the oxygen-containing gas supply passage 52 is provided on the back surface of the second bridge member 64 joined to the third plate 44. The oxygen-containing gas supply channel 74 extends through the first connector section 33b into the second sandwiching member 66, and forms a terminal 74a having an oval shape at the center of the second sandwiching member 66.

Figure 9:
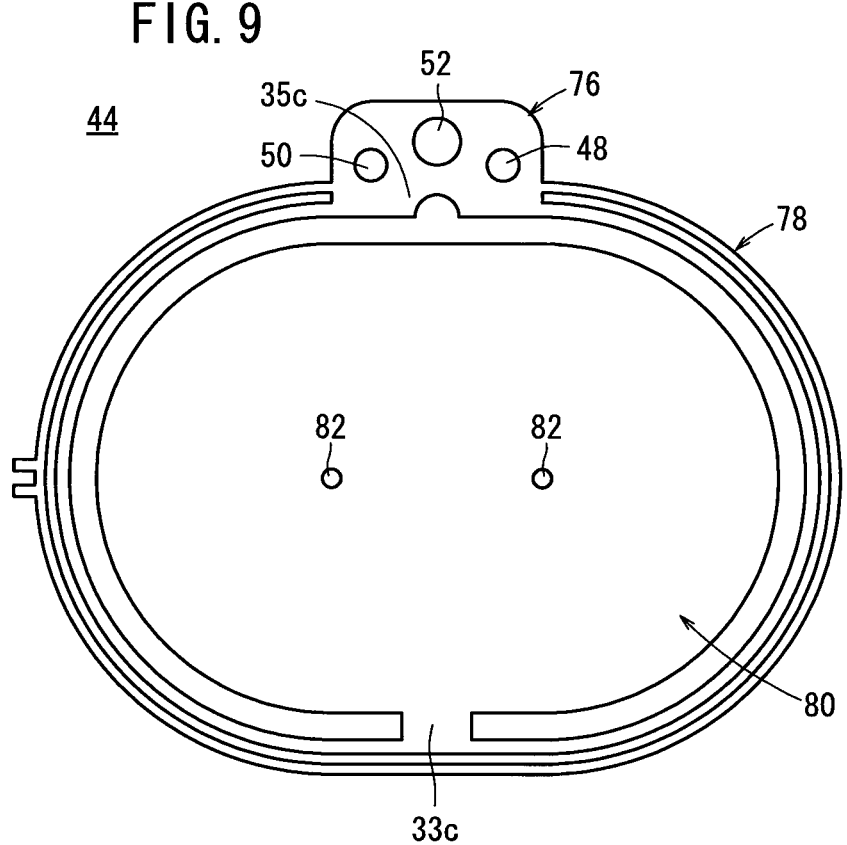
FIG. 9 is a plan view showing a third plate of the separator.

As shown in FIG. 9, the third plate 44 includes a third reactant gas supply member 76 as part of the reactant gas supply section 36, and has a rectangular shape or an oval shape. The fuel gas supply passage 48, the oxygen-containing gas supply passage 52, and the fuel gas discharge passage 50 extend through the third reactant gas supply member 76. A narrow second bridge member 78 is connected to the third reactant gas supply member 76 through a second connector section 35c, and a third sandwiching member 80 having a relatively large diameter is provided integrally with the second bridge member 78 through a first connector section 33c.

At least two oxygen-containing gas inlets 82 for supplying an oxygen-containing gas are formed in the third sandwiching member 80, for example, at positions corresponding to the centers of the oval third sandwiching member 80. The oxygen-containing gas inlets 82 are provided at positions corresponding to the terminal 74a of the second sandwiching member 66.

As shown in FIGS. 3 and 5, a seal member 86 for sealing a space 84 formed between the sandwiching section 32 and the anode 24 of the electrolyte electrode assembly 26 is provided on the sandwiching section 32. The seal member 86 has a substantially ring shape, and includes a flange section 86a fixed to the first sandwiching member 56 around the fuel gas return holes 60, and a presser section 86b provided around the cathode 22 and which presses the outer circumferential portion of the electrolyte 20 of each electrolyte electrode assembly 26.

Firstly, the presser section 86b of the seal member 86 is joined to the outer circumferential portion of the electrolyte 20 such that a glass seal (not shown) is interposed between the presser section 86b and the electrolyte 20. Thereafter, the flange section 86a is joined to the first sandwiching member 56 by laser welding.

As shown in FIG. 3, in the fuel cell 10, a substantially ring-shaped space is formed between the outer circumference of the sandwiching section 32, and the inner circumferences of the bridge section 34 and the reactant gas supply section 36. The space forms an oxygen-containing gas discharge passage 88 for discharging the oxygen-containing gas which has flowed through the oxygen-containing gas channel 28.

As shown in FIGS. 1 and 2, an end plate 90 is provided at one end (lower end) in the stacking direction of the fuel cells 10. The end plate 90 has a shape similar to the outer shape of the fuel cell 10, and has a size larger than the fuel cell 10. The end plate 90 has a fuel gas supply pipe 92, a fuel gas discharge pipe 94, and an oxygen-containing gas supply pipe 96 connected respectively to the fuel gas supply passage 48, the fuel gas discharge passage 50, and the oxygen-containing gas supply passage 52.

The end plate 90 is also equipped with a first load applying mechanism 98 for applying a tightening load to the sandwiching section 32 in the stacking direction. The first load applying mechanism 98 includes a presser member 100 provided on the reactant gas supply section 36 of the uppermost fuel cell 10. A plurality of bolts 104 are inserted into the presser member 100, and screwed into the end plate 90 to apply a desired tightening load to the sandwiching sections 32. For example, a seal member (ceramic) 102 is interposed in each space between the sandwiching sections 32. A positioning pin 106 is provided vertically on the end plate 90 so as to engage with the positioning section 39 of each separator 30.

As a second load applying mechanism, for example, a weight member 108 is placed on the sandwiching section 32 of the uppermost fuel cell 10. The tightening load applied to the reactant gas supply sections 36 stacked in the direction indicated by arrow A is larger than the tightening load applied to the sandwiching sections 32 in the stacking direction.

Operation of the fuel cell stack 12 will be described below.

As shown in FIGS. 1 and 2, the fuel gas (e.g., the hydrogen-containing gas) is supplied from the fuel gas supply pipe 92 provided on the end plate 90 to the fuel gas supply passage 48, and the oxygen-containing gas (hereinafter referred to as air) is supplied from the oxygen-containing gas supply pipe 96 to the oxygen-containing gas supply passage 52.

As shown in FIGS. 4 and 5, the fuel gas flows along the fuel gas supply passage 48 in the stacking direction indicated by the arrow A, and the fuel gas flows along the fuel gas supply channel 68 of each fuel cell 10 in the direction parallel to surfaces of the separators 30.

The fuel gas flows into the fuel gas chamber 68a formed in the sandwiching section 32, and the fuel gas is reformed by the reforming catalyst 72 provided in the fuel gas chamber 68a. The reformed fuel gas as hydrogen rich gas flows through the pair of fuel gas inlets 58 formed in the first sandwiching member 56 into the fuel gas channel 38.

The pair of fuel gas inlets 58 are positioned at substantially central positions of the anode 24 of the electrolyte electrode assembly 26. In the structure, after the fuel gas has been supplied from the pair of fuel gas inlets 58 to the substantially central region of the anode 24, the fuel gas moves along the fuel gas channel 38 toward the outer circumferential portion of the anode 24.

The fuel gas which has flowed through the fuel gas channel 38 moves toward the fuel gas return holes 60 formed in the outer periphery of the electrolyte electrode assembly 26. Thus, after the fuel gas has flowed through the fuel gas return holes 60, the fuel gas is supplied to the fuel gas return channel 70. Then, the fuel gas flows through the fuel gas return channel 70 to the fuel gas discharge passage 50.

In the meanwhile, the air moves along the oxygen-containing gas supply passage 52 of the fuel cell stack 12 in the stacking direction indicated by the arrow A, and the air moves along the oxygen-containing gas supply channel 74 of each fuel cell 10 in the direction in parallel to surfaces of the separators 30.

After the air flows through the terminal 74a of the oxygen-containing gas supply channel 74, the air flows through the pair of oxygen-containing gas inlets 82 formed in the third sandwiching member 80, and then, flows into the oxygen-containing gas channel 28. The pair of oxygen-containing gas inlets 82 are provided at the substantially central positions of the cathode 22 of the electrolyte electrode assembly 26. In the structure, after the air is supplied from the oxygen-containing gas inlets 82 to the substantially central region of the cathode 22, the air flows along the oxygen-containing gas channel 28 toward the outer circumferential portion of the cathode 22.

Thus, in each of the electrolyte electrode assemblies 26, the fuel gas is supplied from the central region to the outer circumferential end on the electrode surface of the anode 24, and the air is supplied from the central region to the outer circumferential end on the electrode surface of the cathode 22. At this time, oxide ions move through the electrolyte 20 to the anode 24, and electricity is generated by electrochemical reactions.

In the first embodiment, all of the fuel gas supply passage 48, the fuel gas discharge passage 50, and the oxygen-containing gas supply passage 52 serving as components of the manifold are formed concentratedly in the single reactant gas supply section 36. In the structure, the components of the manifold (the fuel gas supply passage 48, the fuel gas discharge passage 50, and the oxygen-containing gas supply passage 52) requiring a high load for gas sealing are prevented from being positioned distantly from one another. Thus, it becomes possible to suppress occurrence of distortion in the separators 30 due to heat expansion or heat contraction as much as possible.

Further, failures in contact between the separator 30 and the electrolyte electrode assembly 26 due to distortion is suppressed, and improvement in the power generation is achieved. Further, since damages of the electrolyte electrode assembly 26 due to distortion are suppressed, durability of the electrolyte electrode assembly 26 is improved suitably.

Further, the fuel gas supply passage 48, the fuel gas discharge passage 50, and the oxygen-containing gas supply passage 52 are provided in the reactant gas supply section 36 serving as the reactant gas manifold. The fuel gas supply channel 68, the fuel gas return channel 70, and the oxygen-containing gas supply channel 74 are formed in the bridge section 34. In the structure, the fuel gas and the oxygen-containing gas, which are supply gases, tend to be heated easily by the hot fuel gas, and thermally self-sustaining operation can be facilitated, i.e., the operating temperature of the fuel cell can be maintained only by heat produced in the fuel cell itself without requiring any heat from the outside. Therefore, improvement in the heat efficiency is achieved advantageously Further, in the first embodiment, the bridge section 34 is provided integrally with the reactant gas supply section 36, and surrounds the entire outer circumference of the sandwiching section 32. In the structure, the fuel gas and the oxygen-containing gas serving as the supplied gases are heated by the hot exhaust gas (oxygen-containing gas), which is discharged to the outer circumference of the sandwiching section 32 after the reaction. Thus, thermally self-sustaining operation is facilitated and heat efficiency is improved. Additionally, the overall length of the bridge section 34 becomes larger effectively.

Further, in the sandwiching section 32, a plurality of, e.g., the two fuel gas inlets 58 connecting the fuel gas channel 38 to the fuel gas supply channel 68 are provided. The number of the fuel gas inlets 58 can be determined depending on the surface area of the electrolyte electrode assembly 26. Therefore, fuel gas concentration is distributed uniformly on the electrode surface of the electrolyte electrode assembly 26, and depletion of the fuel can be suppressed.

Further, in the sandwiching section 32, a plurality of, e.g., two oxygen-containing gas inlets 82 connecting the oxygen-containing gas channel 28 and the oxygen-containing gas supply channel 74 are provided. The number of oxygen-containing gas inlets 82 is determined depending on the surface area of the electrolyte electrode assembly 26. Therefore, oxygen-containing gas concentration is distributed uniformly on the electrode surface of the electrolyte electrode assembly 26 becomes uniform, and air depletion can be suppressed.

Further, the fuel gas return holes 60 connecting the fuel gas channel 38 and the fuel gas return channel 70 are formed in the sandwiching section 32. Thus, the fuel gas can smoothly and reliably flow from the fuel gas channel 38 to the fuel gas return channel 70, and the fuel gas concentration can be distributed uniformly on the electrode surface of the electrolyte electrode assembly 26.

Further, the fuel gas return holes 60 connecting the fuel gas channel 38 and the fuel gas return channel 70 are provided in the sandwiching section 32, and the fuel gas return holes 60 are provided on the outer circumferential side of the fuel gas inlets 58 in the sandwiching section 32. The fuel gas supplied from the fuel gas inlets 58 to the anode 24 flows from the substantially central regions toward the outer circumferential region on the anode 24, and then, the fuel gas smoothly flows into the fuel gas return holes 60.

Further, in the fuel cell 10, a substantially ring shaped space is formed between the outer circumference of the sandwiching section 32 and the inner circumference of the bridge section 34 and the reactant gas supply section 36. The space forms the oxygen-containing gas discharge passage 88 for discharging the oxygen-containing gas which has flowed through the oxygen-containing gas channel 28.

In the structure, sufficient heat-transfer areas of the fuel gas supply channel 68 and the oxygen-containing gas supply channel 74 as components of the manifold in the bridge section 34 can be secured, and the hot gas after the reaction (oxygen-containing gas after the reaction) is forcibly blown to the bridge section 34 for causing heat exchange. Therefore, the fuel gas and the oxygen-containing gas flowing through the fuel gas supply channel 68 and the oxygen-containing gas supply channel 74 are suitably heated by the hot gas, and thermally self-sustaining operation can be facilitated, i.e., the operating temperature of the fuel cell can be maintained only by heat produced in the fuel cell itself without requiring any heat from the outside. Therefore, improvement in the heat efficiency is achieved advantageously Further, the separator 30 includes the first connector section 33 connecting the sandwiching section 32 and the bridge section 34, and the second connector section 35 connecting the bridge section 34 and the reactant gas supply section 36. The first connector section 33 and the second connector section 35 are opposite to each other across the sandwiching section 32. In the structure, the bridge section 34 can be made sufficiently long, and the load-separation state between the sandwiching section 32 and the reactant gas supply section 36 (the state where the load applied to the sandwiching section 32 and the load applied to the reactant gas supply section 36 do not affect each other) is achieved reliably.

Further, as shown in FIG. 7, the end of the fuel gas supply channel 68 forms the oval fuel gas chamber 68a at the center of the second sandwiching member 66, and reforming catalyst 72 for reforming the fuel gas is provided in the fuel gas chamber 68a. In the structure, reforming reaction of the fuel gas occurs in the fuel gas chamber 68a, and it becomes possible to reduce the overall size of the fuel cell 10 and thus the overall size of the fuel cell stack 12 formed by stacking the fuel cells 10. Further, heat losses are reduced, and thermally self-sustaining operation can be facilitated.

Moreover, the oxygen-containing gas supply passage 52 is formed between the fuel gas supply passage 48 and the fuel gas discharge passage 50 in the reactant gas supply section 36. Thus, the size of the reactant gas supply section 36 is reduced, and the structure of the reactant gas supply section 36 is simplified. In this regard, the fuel gas supply passage 48, the oxygen-containing gas supply passage 52, and the fuel gas discharge passage 50 are arranged along the outer shape of the sandwiching section 32. Thus, the overall size of the fuel cell 10 can be reduced easily.

Further, the sandwiching section 32 has a circular shape or an oval shape. The bridge section 34 is formed integrally with the reactant gas supply section 36, and has a circular ring shape or an oval ring shape. In the structure, it becomes possible to increase the length of the bridge section 34 easily, and the load-separation state can be achieved. Moreover, heat influence (e.g., concentration of heat stress) can be suppressed.

Further, the fuel cell 10 is a flat plate stack type solid oxide fuel cell. Therefore, the fuel cell 10 can be suitably used as a hot temperature type fuel cell such as a flat plate type solid oxide fuel cell (SOFC).

Figure 10:
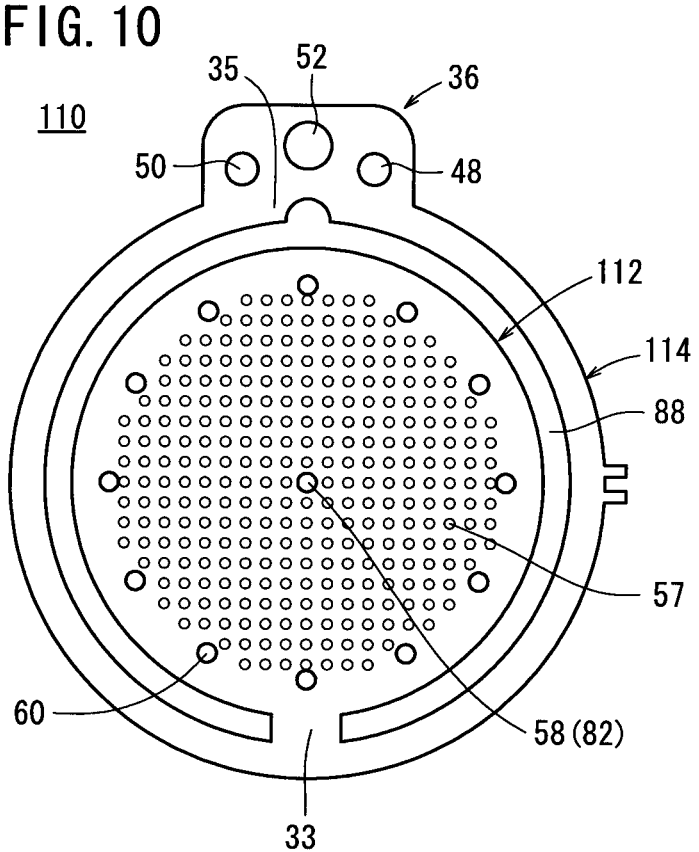
FIG. 10 is a plan view showing a separator of a fuel cell stack according to a second embodiment of the present invention.

FIG. 10 is a plan view showing a separator 110 of a fuel cell stack according to a second embodiment of the present invention. The constituent elements that are identical to those of the fuel cell stack 12 according to the first embodiment are labeled with the same reference numeral, and description thereof will be omitted. Also in third and other embodiments as described later, the constituent elements that are identical to those of the fuel cell stack 12 according to the first embodiment are labeled with the same reference numeral, and description thereof will be omitted.

The separator 110 includes a sandwiching section 112, a bridge section 114, and a reactant gas supply section 36. The sandwiching section 112 has a circular shape. Likewise, the electrolyte electrode assembly (not shown) has a circular shape.

The bridge section 114 is formed integrally with the reactant gas supply section 36, and surrounds the entire circumference of the sandwiching section 112. As with the sandwiching section 112, the bridge section 114 and the reactant gas supply section 36 have a circular shape as a whole. One fuel gas inlet 58 and one oxygen-containing gas inlet 82 are formed corresponding to the center of the sandwiching section 112.

In the second embodiment, the same advantages as in the case of the first embodiment are obtained. In third and fourth embodiments, though fuel cells having an oval (elliptic) structure will be described, in these embodiments, the fuel cells having a circular structure may be adopted as in the case of the second embodiment.

Figure 11:
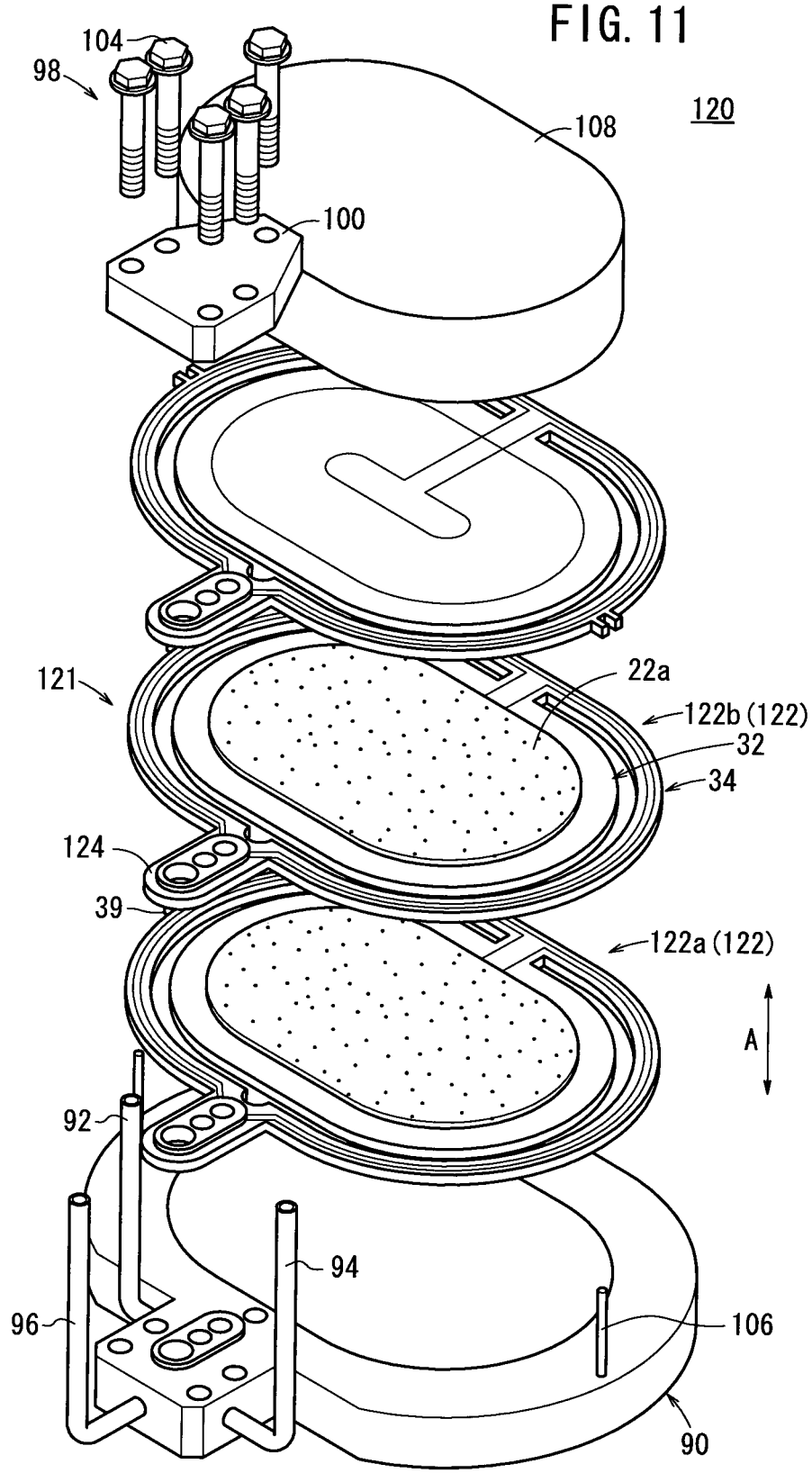
FIG. 11 is a partial exploded perspective view showing a fuel cell stack according to a third embodiment of the present invention.

FIG. 11 is an exploded perspective view showing a fuel cell stack 120 according to a third embodiment of the present invention.

The fuel cell stack 120 is formed by stacking a plurality of fuel cells 121 in a direction indicated by an arrow A, and each of the fuel cells 121 includes one electrolyte electrode assembly 26 and a pair of separators 122 sandwiching the electrolyte electrode assembly 26.

The separator 122 selectively uses a first separator 122a and a second separator 122b, and more specifically one or more first separator 122a and one or more second separator 122b are stacked alternately. For example, at least one first separator 122a and at least one second separator 122b are arranged alternately one by one, and the electrolyte electrode assembly 26 is sandwiched between the first separator 122a and the second separator 122b to form the fuel cell stack 120.

Alternatively, first separators 122a may be stacked together such that an electrolyte electrode assembly 26 is sandwiched between the adjacent first separators 122a, second separators 122b may be stacked together such that an electrolyte electrode assembly 26 is sandwiched between the adjacent second separators 122b, and the first separators 122a and the second separators 122b may be stacked together to form the fuel cell stack 120.

Figure 12:
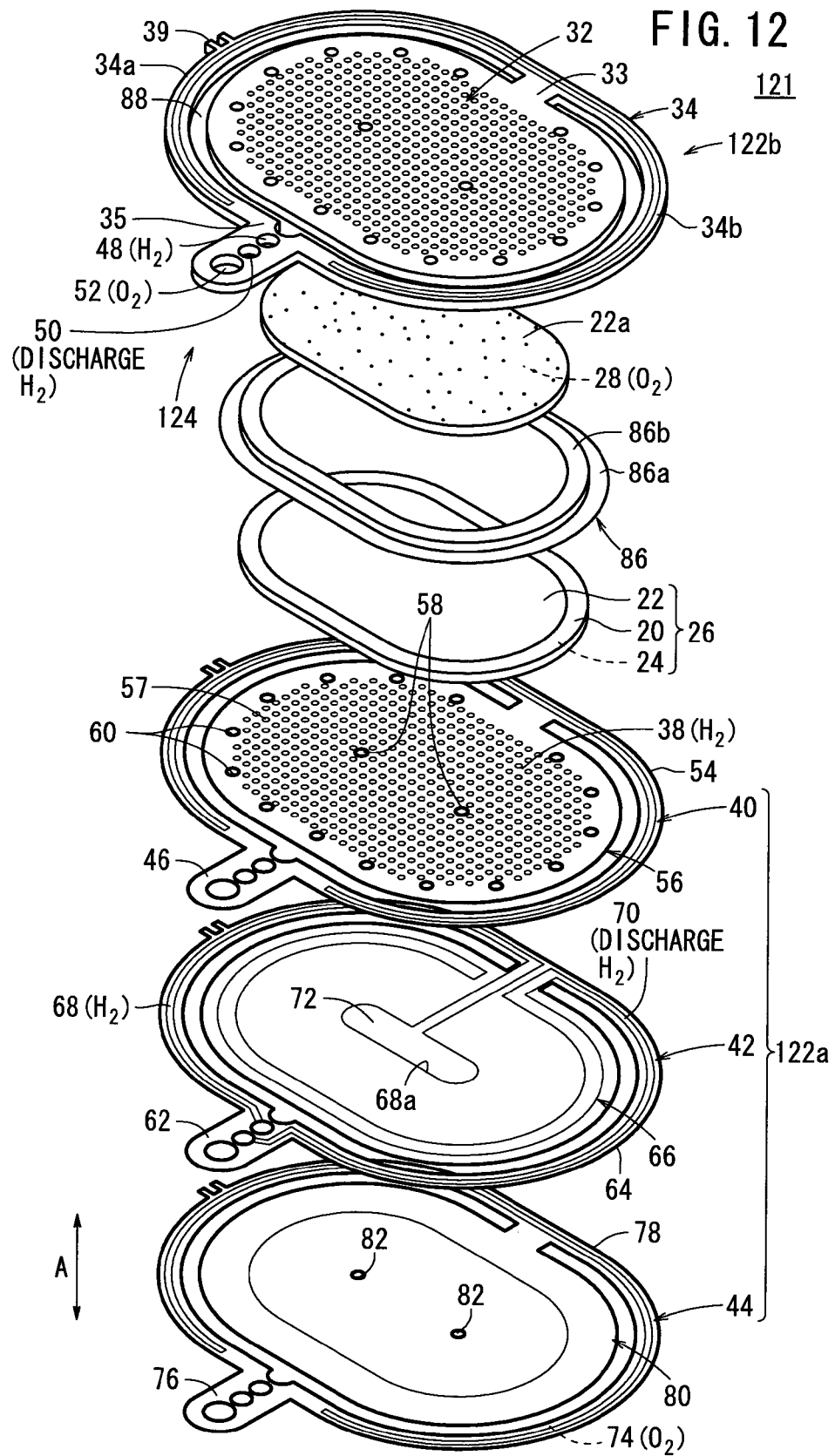
FIG. 12 is an exploded perspective view showing a fuel cell of the fuel cell stack.
Figure 13:
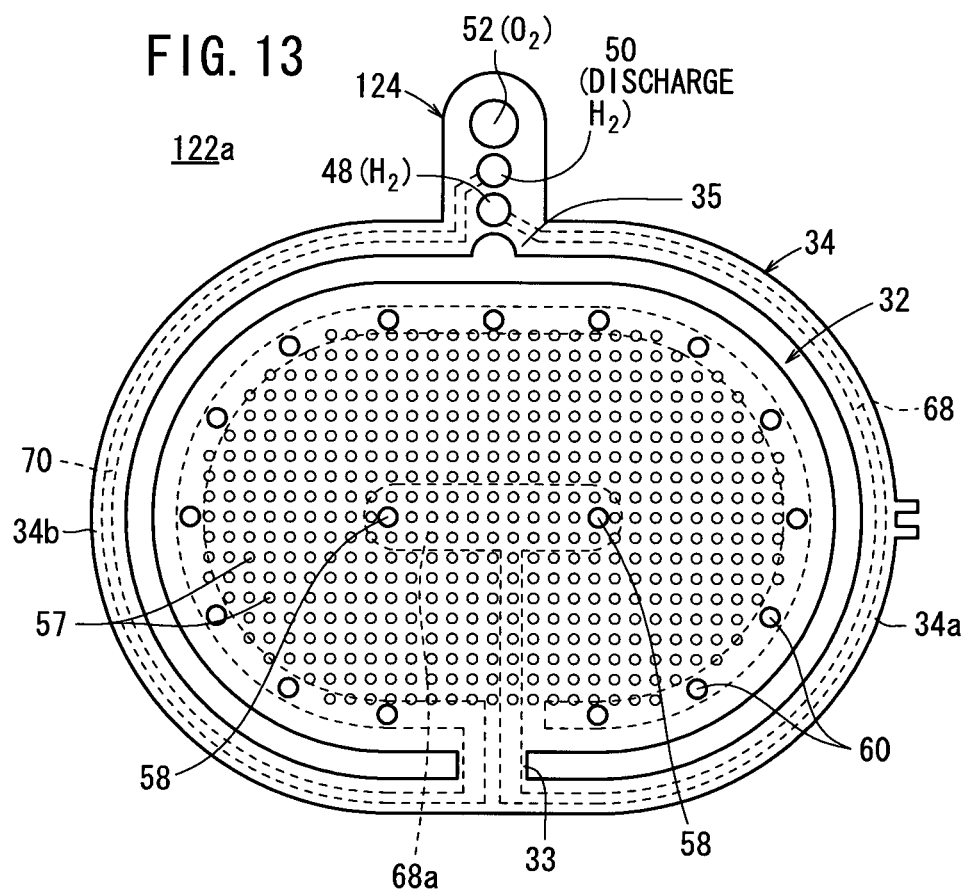
FIG. 13 is a plan view showing a separator of the fuel cell as viewed from one side.
Figure 14:
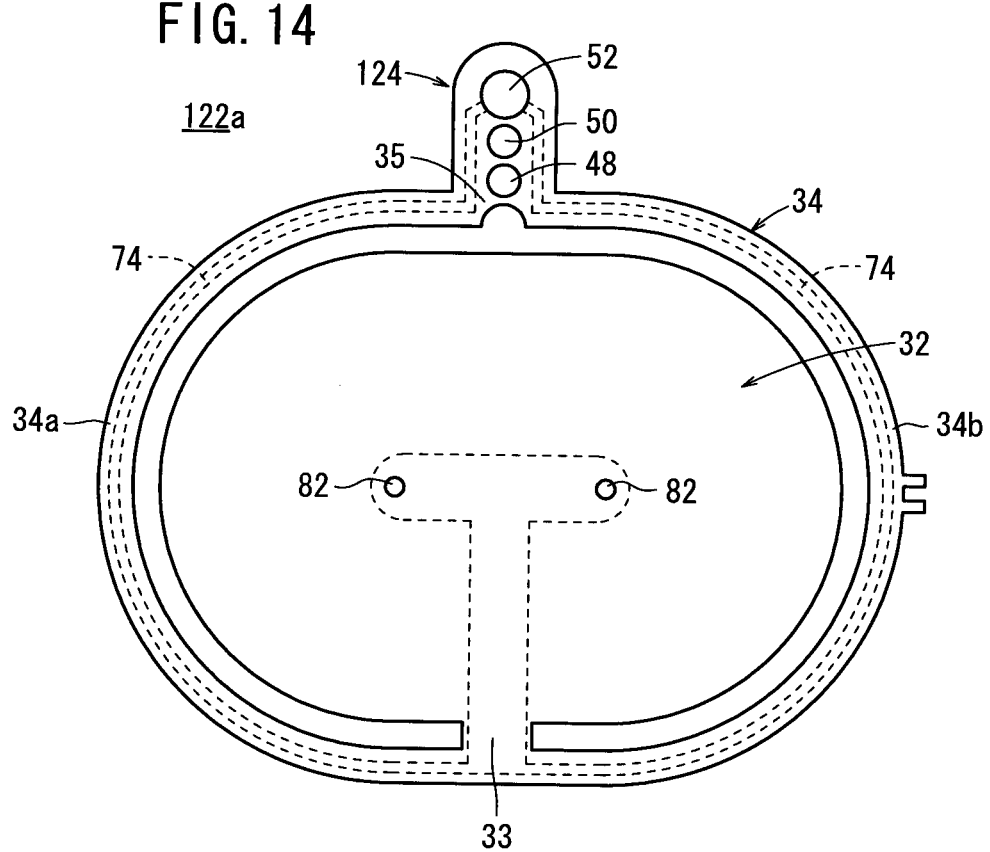
FIG. 14 is a plan view showing the separator as viewed from the other side.

As shown in FIGS. 12 to 14, the first separator 122a includes a sandwiching section 32 for sandwiching one electrolyte electrode assembly 26, a narrow bridge section 34 having one end connected to the sandwiching section 32, and a reactant gas supply section 124 connected integrally to the other end of the bridge section 34.

In the reactant gas supply section 124, the fuel gas supply passage 48, the fuel gas discharge passage 50, and the oxygen-containing gas supply passage 52 are arranged successively toward the outside of the separator 122. In the reactant gas supply section 124, the fuel gas discharge passage 50 is formed between the fuel gas supply passage 48 and the oxygen-containing gas supply passage 52, and the fuel gas supply passage 48, the fuel gas discharge passage 50, and the oxygen-containing gas supply passage 52 are arranged in a direction interesting the outer shape of the sandwiching section 32.

As shown in FIG. 12, the fuel gas supply channel 68 is connected to the fuel gas supply passage 48 at one end thereof, and extends in and along one side 34a of the bridge section 34 toward the first connector section 33. The fuel gas supply channel 68 further extends through the first connector section 33 into the sandwiching section 32, and is terminated inside the sandwiching section 32 and communicates with the two fuel gas inlets 58. A fuel gas return channel 70 is connected to the fuel gas discharge passage 50 at one end thereof and extends in and along the other side 34b of the bridge section 34 toward the first connector section 33. The fuel gas return channel 70 further extends through the first connector section 33, and is terminated inside the sandwiching section 32. Then, the fuel gas return channel 70 communicates with the fuel gas return holes 60.

As shown in FIG. 14, the oxygen-containing gas supply channel 74 is connected to the oxygen-containing gas supply passage 52 at one end thereof. The oxygen-containing gas supply channel 74 extends in and along both the sides 34a, 34b of the bridge section 34 toward the first connector section 33. The oxygen-containing gas supply channel 74 further extends through the first connector section 33, and is terminated inside the sandwiching section 32. Then, the oxygen-containing gas supply channel 74 communicates with the two oxygen-containing gas inlets 82.

Figure 15:
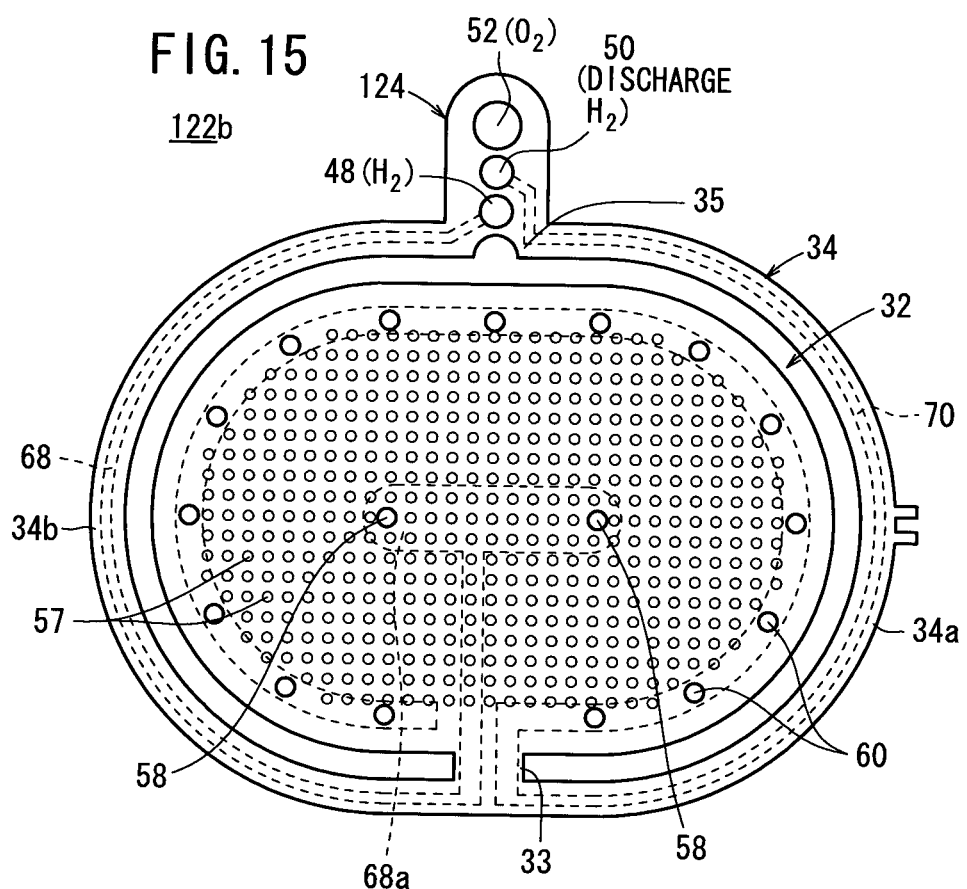
FIG. 15 is a plan view showing another structure of the separator.

As shown in FIG. 15, in the second separator 122b, the fuel gas supply channel 68 is connected to the fuel gas supply passage 48 at one end thereof, and the fuel gas supply channel 68 extends in and along the other side 34b of the bridge section 34 toward the first connector section 33. The fuel gas supply channel 68 further extends through the first connector section 33 and is terminated inside the sandwiching section 32. Then, the fuel gas supply channel 68 communicates with the two fuel gas inlets 58. The fuel gas return channel 70 is connected to the fuel gas discharge passage 50 at one end thereof, and extends in and along the one side 34a of the bridge section 34 toward the first connector section 33. The fuel gas return channel 70 further extends through the first connector section 33, and is terminated inside the sandwiching section 32. Then, the fuel gas return channel 70 communicates with the fuel gas return holes 60.

In the third embodiment, the fuel gas discharge passage 50 is formed between the fuel gas supply passage 48 and the oxygen-containing gas supply passage 52 in the reactant gas supply section 124. In the structure, the fuel gas and the oxygen-containing gas, which serve as the supply gases, are heated by the hot fuel gas that has flowed through the fuel gas channel 38 and then moves in the fuel gas discharge passage 50. Thus, thermally self-sustaining operation is facilitated, and improvement in the thermal efficiency is achieved.

Further, the fuel gas supply passage 48, the fuel gas discharge passage 50, and the oxygen-containing gas supply channel 52 are arranged in a direction intersecting with the outer shape of the sandwiching section 32. Thus, the structure of the reactant gas supply section 124 can be simplified easily, and the size of the reactant gas supply section 124 can be reduced easily.

Further, in the third embodiment, as the separator 122, the first separator 122a and the second separator 122b are used selectively. In the first separator 122a, the fuel gas return channel 70 serving as a passage of the hot fuel gas is formed in and along the other side 34b of the bridge section 34. In the second separator 122b, the fuel gas return channel 70 serving as the passage of the hot fuel gas is formed in and along one side 34a of the bridge section 34.

In the structure, in the first separator 122a, the other side 34b of the bridge section 34 tends to be hot, and in the second separator 122b, the one side 34a of the bridge section 34 tends to be hot. Therefore, in the fuel cell stack 120, one or more first separator 122a and one or more second separator 122b are stacked alternately to achieve a uniform temperature distribution in the entire fuel cell stack 120 more reliably.

Figure 16:
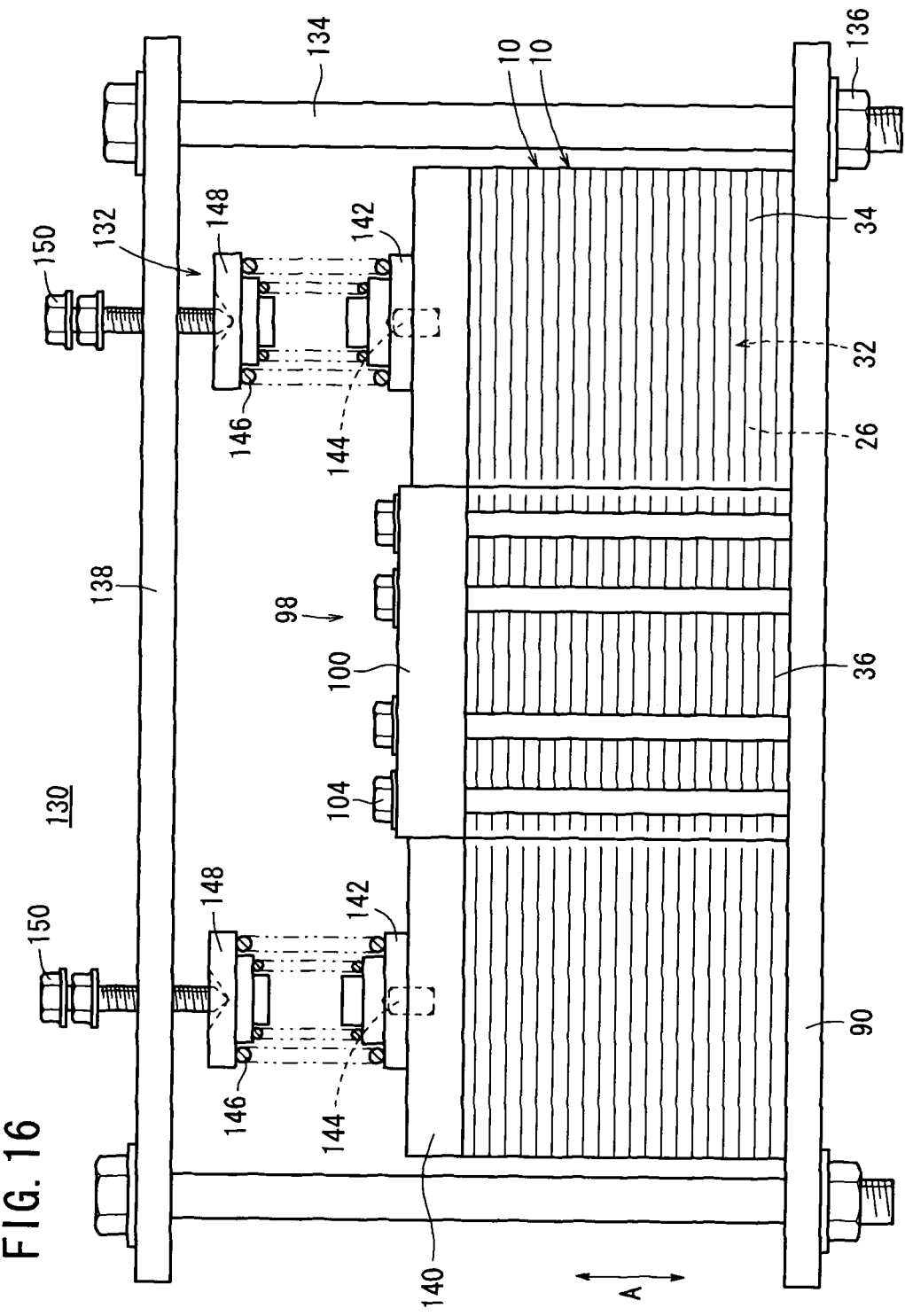
FIG. 16 is a side view showing a fuel cell stack according to a fourth embodiment of the present invention.
Figure 17:
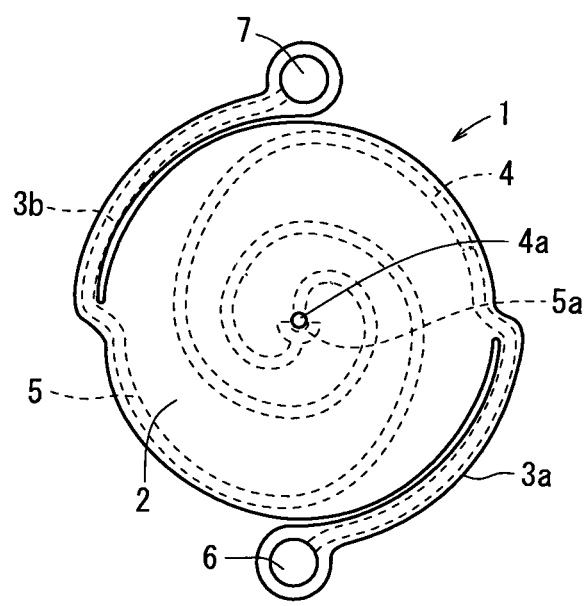
FIG. 17 is a view showing a fuel cell disclosed in Japanese Laid-Open Patent Publication No. 2008-251236.

FIG. 16 is a side view showing a fuel cell stack 130 according to a fourth embodiment of the present invention.

The fuel cell stack 130 is formed by stacking a plurality of fuel cells 10 in a direction indicated by an arrow A, and includes a second load applying mechanism 132 for applying load to the sandwiching sections 32 in the stacking direction. The second load applying mechanism 132 is adopted instead of the weight member 108 according to the first embodiment.

A fixing plate member 138 is fixed to the end plate 90 using a plurality of bolts 134 and nuts 136. A presser plate 140 having the same shape as the sandwiching section 32 is placed on the uppermost fuel cell 10, and for example, two first receiver members 142 are attached onto the presser plate 140. Each of the first receiver members 142 is positioned on and supported by the presser plate 140 by a pin 144.

The fuel cell stack 130 further includes springs 146, second receiver members 148, and presser bolts 150. One end of each spring 146 abuts against the first receiver member 142, and the other end of the spring 146 abuts against the second receiver member 148. The front end of the presser bolt 150 abuts against the second receiver member 148. The presser bolt 150 is fixed to the fixing plate member 138 such that the position of the presser bolt 150 is adjustable.

In the fourth embodiment, bolts 104 of the first load applying mechanism 98 are inserted into the presser member 100, and screwed into the end plate 90. Thus, a desired tightening load is applied to the second sandwiching sections 32. Further, the presser bolts 150 of the second load applying mechanism 132 are screwed into the fixing plate member 138. Thus, a desired tightening load is applied to the sandwiching sections 32 and the electrolyte electrode assemblies 26 under elastic force of the springs 146.

It should be noted that, instead of the weight member 108 and the second load applying mechanism 132, a member which is expanded by heat (e.g., mixed material of alumina fiber and vermiculite or the like) can be used as the second load applying mechanism.

Although certain preferred embodiments of the present invention have been shown and described in detail, it should be understood that various changes and modifications may be made therein without departing from the scope of the appended claims.

The invention claimed is:

1. A fuel cell stack formed by stacking a plurality of fuel cells in a stacking direction, the fuel cells each formed by stacking an electrolyte electrode assembly and a separator, the electrolyte electrode assembly including an anode, a cathode, and an electrolyte interposed between the anode and the cathode, the separator comprising:

a sandwiching section for sandwiching the electrolyte electrode assembly, a fuel gas channel for supplying a fuel gas along an electrode surface of the anode and an oxygen-containing gas channel for supplying an oxygen-containing gas along an electrode surface of the cathode being provided separately in the sandwiching section;

a bridge section connected to part of an outer circumference surface of the sandwiching section, a fuel gas supply channel for supplying the fuel gas to the fuel gas channel, a fuel gas return channel for returning the fuel gas which has flowed through the fuel gas channel, and an oxygen-containing gas supply channel for supplying the oxygen-containing gas to the oxygen-containing gas channel being formed in the bridge section;
a reactant gas supply section connected to the bridge section, a fuel gas supply passage for supplying the fuel gas to the fuel gas supply channel, a fuel gas discharge passage for discharging the fuel gas which has flowed through the fuel gas return channel, and an oxygen-containing gas supply passage for supplying the oxygen-containing gas to the oxygen-containing gas supply channel each extending through the reactant gas supply section in the stacking direction;
a first connector section connecting the bridge section and said part of the outer circumference surface of the sandwiching section; and
a second connector section connecting the bridge section and the reactant gas supply section,
wherein the bridge section is provided integrally with the reactant gas supply section, and surrounds an entire outer periphery of the outer circumference surface of the sandwiching section, and
the first connector section and the second connector section are arranged opposite to each other across the outer circumference surface of the sandwiching section.

2. The fuel cell stack according to claim 1, wherein at least one fuel gas inlet connecting the fuel gas channel and the fuel gas supply channel is formed in the sandwiching section.

3. The fuel cell stack according to claim 1, wherein at least one oxygen-containing gas inlet connecting the oxygen-containing gas channel and the oxygen-containing gas supply channel is formed in the sandwiching section.

4. The fuel cell stack according to claim 1, wherein at least one fuel gas return hole connecting the fuel gas channel and the fuel gas return channel is formed in the sandwiching section.

5. The fuel cell stack according to claim 2, wherein at least one fuel gas return hole connecting the fuel gas channel and the fuel gas return channel is formed in the sandwiching section; and
the fuel gas return hole is positioned on an outer circumferential side of the fuel gas inlet in the sandwiching section.

6. The fuel cell stack according to claim 1, wherein a space is formed between the outer circumference surface of the sandwiching section and inner circumferences of the bridge section and the reactant gas supply section; and
the space forms an oxygen-containing gas discharge passage for discharging the oxygen-containing gas which has flowed through the oxygen-containing gas channel.

7. The fuel cell stack according to claim 1, wherein reforming catalyst for reforming the fuel gas is provided at least in part of the fuel gas supply channel.

8. The fuel cell stack according to claim 1, wherein the oxygen-containing gas supply passage is positioned between the fuel gas supply passage and the fuel gas discharge passage in the reactant gas supply section.

9. The fuel cell stack according to claim 8, wherein the fuel gas supply passage, the oxygen-containing gas supply passage, and the fuel gas discharge passage are arranged along an outer shape of the sandwiching section.

10. The fuel cell stack according to claim 1, wherein the fuel gas discharge passage is provided between the fuel gas supply passage and the oxygen-containing gas supply passage in the reactant gas supply section.

11. The fuel cell stack according to claim 10, wherein the fuel gas supply passage, the fuel gas discharge passage, and the oxygen-containing gas supply passage are arranged in a direction intersecting with an outer shape of the sandwiching section.

12. The fuel cell stack according to claim 1, wherein the sandwiching section has a circular shape or an oval shape; and
the bridge section and the reactant gas supply section jointly have a circular ring shape or an oval ring shape as a whole.

13. The fuel cell stack according to claim 1, wherein the bridge section includes a first side connected to one end of the reactant gas supply section and a second side connected to another end of the reactant gas supply section; and
the separator includes a first separator having the fuel gas supply channel formed in the first side and the fuel gas return channel formed in the second side, and a second separator having the fuel gas return channel formed in the first side and the fuel gas supply channel formed in the second side.

14. The fuel cell stack according to claim 13, wherein one or more first separator and one or more second separator are stacked alternately.

15. The fuel cell stack according to claim 1, wherein the fuel cell is a solid oxide fuel cell.

16. The fuel cell stack according to claim 15, wherein the solid oxide fuel cell is a flat plate stack type solid oxide fuel cell.

17. The fuel cell stack according to claim 1, wherein said part of the outer circumference surface of the sandwiching section is less than all of the outer circumference surface of the sandwiching section, and, with respect to the sandwiching section, the bridge section is only connected to said part of the outer circumference surface of the sandwiching section, and the bridge section is spaced from all other parts of the outer circumference surface of the sandwiching section.

18. The fuel cell stack according to claim 17, wherein a space is formed between said all other parts of the outer circumference surface of the sandwiching section and inner circumferences of the bridge section and the reactant gas supply section, and
the space is empty and forms an oxygen-containing gas discharge passage for discharging the oxygen-containing gas which has flowed through the oxygen-containing gas channel.

19. The fuel cell stack according to claim 6, wherein the space formed between the outer circumference surface of the sandwiching section and inner circumferences of the bridge section and the reactant gas supply section is empty.

* * * * *